US012092061B1

(12) United States Patent
DiCintio

(10) Patent No.: US 12,092,061 B1
(45) Date of Patent: Sep. 17, 2024

(54) AXIAL FUEL STAGE IMMERSED INJECTORS WITH INTERNAL COOLING

(71) Applicant: GE Infrastructure Technology LLC, Greenville, SC (US)

(72) Inventor: Richard Martin DiCintio, Simpsonville, SC (US)

( * ) Notice: Subject to any disclaimer, the term of this patent is extended or adjusted under 35 U.S.C. 154(b) by 0 days.

(21) Appl. No.: 18/399,845

(22) Filed: Dec. 29, 2023

(51) Int. Cl.
*F02M 55/00* (2006.01)
*F02M 53/08* (2006.01)
*F02M 57/00* (2006.01)
*F02M 61/18* (2006.01)

(52) U.S. Cl.
CPC .......... *F02M 55/008* (2013.01); *F02M 53/08* (2013.01); *F02M 55/001* (2013.01); *F02M 55/004* (2013.01); *F02M 57/005* (2013.01); *F02M 61/1806* (2013.01); *F02M 2200/24* (2013.01); *F05D 2220/321* (2013.01)

(58) Field of Classification Search
CPC .... F02M 55/008; F02M 53/08; F02M 55/001; F02M 55/004; F02M 57/005; F02M 61/1806; F02M 2200/24; F05D 2220/321
See application file for complete search history.

(56) References Cited

U.S. PATENT DOCUMENTS

| | | | |
|---|---|---|---|
| 5,383,766 | A | 1/1995 | Przirembel et al. |
| 5,813,836 | A | 9/1998 | Starkweather |
| 6,047,550 | A | 4/2000 | Beebe |
| 6,192,688 | B1 | 2/2001 | Beebe |
| 6,206,638 | B1 | 3/2001 | Glynn et al. |
| 6,868,676 | B1 | 3/2005 | Haynes |
| 7,568,887 | B1 | 8/2009 | Liang |
| 7,854,591 | B2 | 12/2010 | Liang |
| 8,112,216 | B2 | 2/2012 | Davis, Jr. et al. |
| 8,167,559 | B2 | 5/2012 | Liang |
| 8,402,768 | B2 | 3/2013 | Syed et al. |
| 8,677,753 | B2 | 3/2014 | Melton et al. |
| 8,683,808 | B2 | 4/2014 | Venkataraman et al. |
| 8,701,382 | B2 | 4/2014 | Davis, Jr. et al. |
| 8,701,383 | B2 | 4/2014 | Venkataraman et al. |
| 8,701,418 | B2 | 4/2014 | Venkataraman et al. |
| 8,707,707 | B2 | 4/2014 | Venkataraman et al. |
| 8,931,280 | B2 | 1/2015 | Kaleeswaran et al. |
| 9,052,115 | B2 | 6/2015 | Stoia et al. |

(Continued)

FOREIGN PATENT DOCUMENTS

| | | | |
|---|---|---|---|
| EP | 3232002 | A1 | 10/2017 |

*Primary Examiner* — Xiao En Mo
(74) *Attorney, Agent, or Firm* — James Pemrick; Charlotte Wilson; Hoffman Warnick LLC

(57) ABSTRACT

An immersed axial fuel stage (AFS) injector includes an injector body configured to be positioned in a hot gas path within a combustion liner. The injector body includes an outer wall defining a hollow interior and having film cooling holes extending from the hollow interior to an outside of the outer wall, and an inner wall spaced from an inside of the outer wall along at least part of a length of the outer wall, the inner wall defining an air plenum therein. Impingement cooling holes in fluid communication with the air plenum extend through the inner wall along at least a portion of the inner wall. A fuel passage extends at least partially along the hollow interior of the outer wall, and fuel nozzles in fluid communication with the fuel passage extend through to the outside of the outer wall.

20 Claims, 10 Drawing Sheets

(56) References Cited

U.S. PATENT DOCUMENTS

| | | | |
|---|---|---|---|
| 9,097,424 | B2 | 8/2015 | Chen et al. |
| 9,140,455 | B2 | 9/2015 | Stoia et al. |
| 9,151,500 | B2 | 10/2015 | Chen et al. |
| 9,284,888 | B2 | 3/2016 | Romig et al. |
| 9,316,396 | B2 | 4/2016 | DiCintio et al. |
| 9,447,971 | B2 | 9/2016 | Kim et al. |
| 9,617,859 | B2 | 4/2017 | Morgan et al. |
| 9,938,903 | B2 | 4/2018 | Hughes et al. |
| 9,945,294 | B2 | 4/2018 | Hughes et al. |
| 9,945,562 | B2 | 4/2018 | Hughes et al. |
| 9,976,487 | B2 | 5/2018 | Hughes et al. |
| 9,989,260 | B2 | 6/2018 | Hughes et al. |
| 9,995,221 | B2 | 6/2018 | Hughes et al. |
| 10,006,367 | B2 | 6/2018 | Romanov et al. |
| 10,100,646 | B2 | 10/2018 | Propheter-Hinckley et al. |
| 10,220,474 | B2 | 3/2019 | Theuer et al. |
| 10,228,138 | B2 | 3/2019 | Theuer et al. |
| 10,364,681 | B2 | 7/2019 | Krumanaker et al. |
| 10,704,399 | B2 | 7/2020 | Lacy et al. |
| 10,760,430 | B2 | 9/2020 | Lacy et al. |
| 10,927,680 | B2 | 2/2021 | Lacy et al. |
| 11,021,969 | B2 | 6/2021 | Krumanaker et al. |
| 11,041,389 | B2 | 6/2021 | Lacy et al. |
| 11,187,415 | B2 | 11/2021 | Jones et al. |
| 11,371,699 | B2 | 6/2022 | Bolanos Chaverri et al. |
| 11,434,821 | B2 | 9/2022 | Wertz |
| 11,566,536 | B1 | 1/2023 | Cox |
| 11,767,766 | B1 | 9/2023 | Matthews et al. |
| 2015/0047360 | A1* | 2/2015 | Baruah .................. F23R 3/346<br>60/746 |
| 2019/0120064 | A1 | 4/2019 | Jennings et al. |

* cited by examiner

AXIAL FUEL STAGE IMMERSED INJECTORS WITH INTERNAL COOLING

TECHNICAL FIELD

The disclosure relates generally to turbomachine combustors and, more specifically, to axial fuel stage immersed injectors with internal cooling.

BACKGROUND

Gas turbine systems include a combustion section including a plurality of combustors in which fuel is combusted to create a flow of combusted gas that is converted to kinetic energy in a downstream turbine. Axial fuel stage (AFS) immersed injectors extend radially into a combustion liner of the combustor to combust fuel in a secondary combustion zone downstream of a primary combustion zone. The AFS immersed injectors are used to provide higher energy combustion gases to the turbine and a more efficient combustor.

BRIEF DESCRIPTION

All aspects, examples and features mentioned below can be combined in any technically possible way.

An aspect of the disclosure includes an axial fuel stage (AFS) immersed injector, comprising: an injector body configured to be positioned in a hot gas path within a combustion liner, the injector body including: an outer wall defining a hollow interior and having a plurality of film cooling holes extending from the hollow interior to an outside of the outer wall; an inner wall spaced from an inside of the outer wall along at least part of a length of the outer wall, the inner wall defining an air plenum therein; a first plurality of impingement cooling holes extending through the inner wall along at least a first portion of the inner wall, the first plurality of impingement cooling holes in fluid communication with the air plenum; a fuel passage extending at least partially along the hollow interior of the outer wall; and a plurality of fuel nozzles extending through at least one of the inner wall and the outer wall to the outside of the outer wall, each fuel nozzle in fluid communication with the fuel passage.

Another aspect of the disclosure includes any of the preceding aspects, and further comprising a coupler at a first end of the injector body, the coupler configured to couple the injector body in an opening of the combustion liner.

Another aspect of the disclosure includes any of the preceding aspects, and the air plenum includes a plurality of air plenums.

Another aspect of the disclosure includes any of the preceding aspects, and further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, and wherein the air passage is in fluid communication with an outlet of an upstream one of the first plurality of impingement cooling holes and the second plurality of impingement cooling holes.

Another aspect of the disclosure includes any of the preceding aspects, and the intermediate wall includes a plurality of intermediate walls spaced along a respective plurality of second portions of the inner wall and the outer wall.

Another aspect of the disclosure includes any of the preceding aspects, and the air plenum is in fluid communication with a compressed air delivery plenum extending along an outside of the combustion liner.

Another aspect of the disclosure includes a combustor for a gas turbine system, the combustor comprising: a combustion liner; a plurality of axial fuel stage (AFS) immersed injectors extending radially into the combustion liner, each AFS immersed injector including an injector body including: an outer wall defining a hollow interior and having a plurality of film cooling holes extending from the hollow interior to an outside of the outer wall; an inner wall spaced from an inside of the outer wall along at least part of a length of the outer wall, the inner wall defining an air plenum therein; a first plurality of impingement cooling holes extending through the inner wall along at least a first portion of the inner wall, the first plurality of impingement cooling holes in fluid communication with the air plenum; a fuel passage extending at least partially along the hollow interior of the outer wall; and a plurality of fuel nozzles extending through at least one of the inner wall and the outer wall to the outside of the outer wall, each fuel nozzle in fluid communication with the fuel passage.

Another aspect of the disclosure includes any of the preceding aspects, and further comprising a coupler at a first end of the injector body, the coupler configured to couple the injector body in an opening of the combustion liner.

Another aspect of the disclosure includes any of the preceding aspects, and the air plenum includes a plurality of air plenums.

Another aspect of the disclosure includes any of the preceding aspects, and further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, and wherein the air passage is in fluid communication with an outlet of an upstream one of the first plurality of impingement cooling holes and the second plurality of impingement cooling holes.

Another aspect of the disclosure includes any of the preceding aspects, and the intermediate wall includes a plurality of intermediate walls spaced along a respective plurality of second portions of the inner wall and the outer wall.

Another aspect of the disclosure includes any of the preceding aspects, and the air plenum is in fluid communication with a compressed air delivery plenum extending along an outside of the combustion liner.

Another aspect of the disclosure includes any of the preceding aspects, and further comprising a head end fuel nozzle assembly coupled to a forward end of the combustion liner for supplying a fuel and air combustible mixture to the combustion liner.

Another aspect of the disclosure includes a gas turbine (GT) system, comprising: a compressor section; a combustion section operatively coupled to the compressor section; and a turbine section operatively coupled to the combustion section, wherein the combustion section includes at least one combustor including a combustion liner and a plurality of axial fuel stage (AFS) immersed injectors extending radially into the combustion liner, each AFS immersed injector including an injector body including: an outer wall defining a hollow interior and having a plurality of film cooling holes extending from the hollow interior to an outside of the outer wall; an inner wall spaced from an inside of the outer wall along at least part of a length of the outer wall, the inner wall defining an air plenum therein; a first plurality of impingement cooling holes extending through the inner wall along at least a first portion of the inner wall, the first plurality of impingement cooling holes in fluid communication with the air plenum; a fuel passage extending at least partially along the hollow interior of the outer wall; and a plurality of fuel nozzles extending through at least one of the inner all and the outer wall to the outside of the outer wall, each fuel nozzle in fluid communication with the fuel passage.

Another aspect of the disclosure includes any of the preceding aspects, and further comprising a coupler at a first end of the injector body, the coupler configured to couple the injector body in an opening of the combustion liner.

Another aspect of the disclosure includes any of the preceding aspects, and the air plenum includes a plurality of air plenums.

Another aspect of the disclosure includes any of the preceding aspects, and further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, and wherein the air passage is in fluid communication with an outlet of an upstream one of the first plurality of impingement cooling holes and the second plurality of impingement cooling holes.

Another aspect of the disclosure includes any of the preceding aspects, and the intermediate wall includes a plurality of intermediate walls spaced along a respective plurality of second portions of the inner wall and the outer wall.

Another aspect of the disclosure includes any of the preceding aspects, and the air plenum is in fluid communication with a compressed air delivery plenum extending along an outside of the combustion liner.

Another aspect of the disclosure includes any of the preceding aspects, and further comprising a head end fuel nozzle assembly coupled to a forward end of the combustion liner for supplying a fuel and air combustible mixture to the combustion liner.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
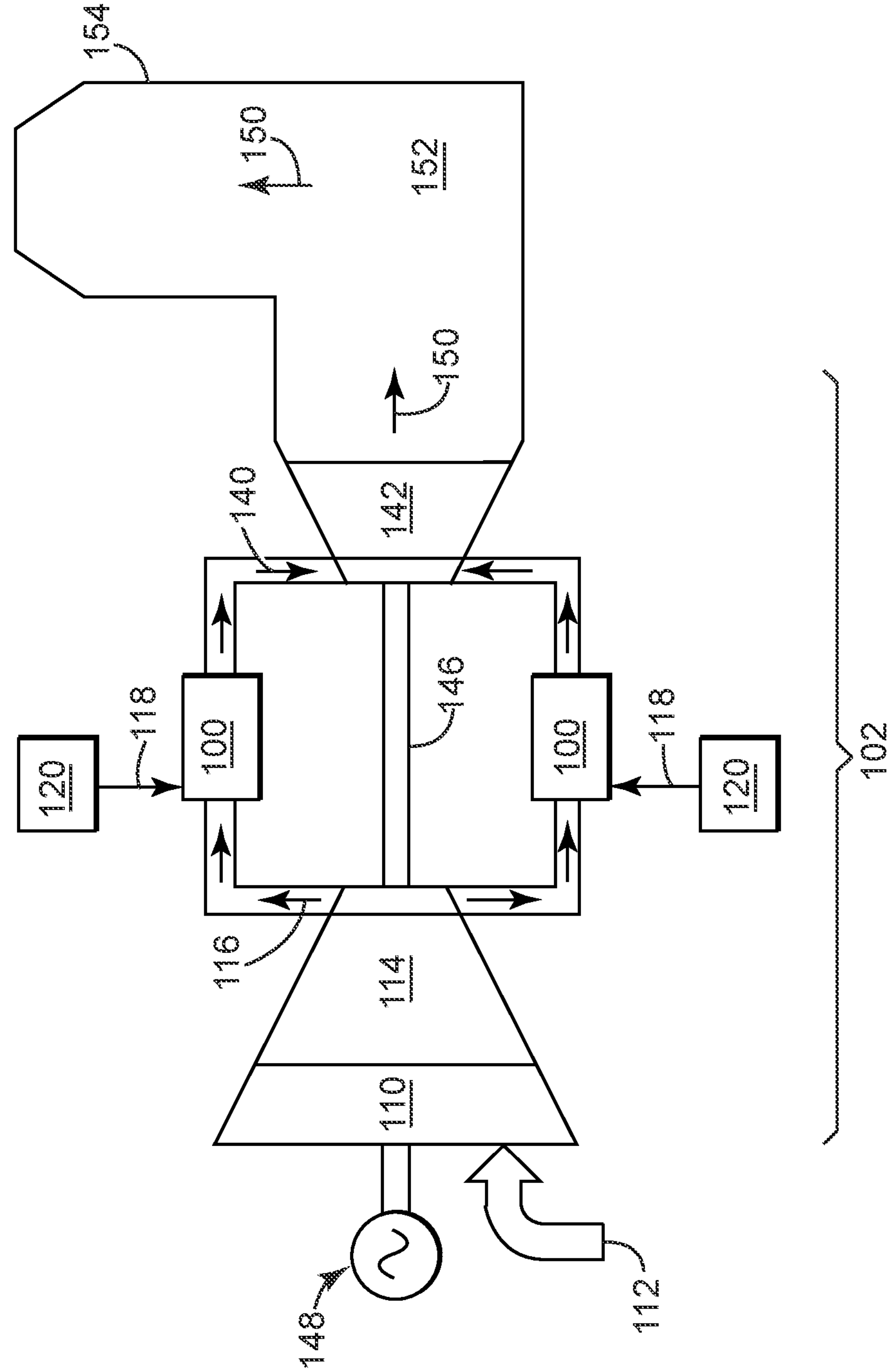
FIG. 1 shows a functional block diagram of an illustrative gas turbine system capable of use with a combustor with an axial fuel stage (AFS) immersed injector according to the various embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through a combustor of the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

The term "axial" refers to movement or position parallel to an axis, e.g., an axis of a combustor or turbomachine. The term "radial" refers to movement or position perpendicular to an axis, e.g., an axis of a combustor or a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a combustion liner or a circumferential interior of casing extending about a combustor. As indicated above and depending on context, it will be appreciated that such terms may be applied in relation to the axis of the combustor or the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments of the disclosure provide an immersed axial fuel stage (AFS) injector that includes an injector body configured to be positioned in a hot gas path within a combustion liner. The injector body includes an outer wall defining a hollow interior and having film cooling holes extending from the hollow interior to an outside of the outer wall, and an inner wall spaced from an inside of the outer wall along at least part of a length of the outer wall, the inner wall defining an air plenum therein. Impingement cooling holes in fluid communication with the air plenum extend through the inner wall along at least a portion of the inner wall and the outer wall. A fuel passage extends at least partially along the hollow interior of the outer wall, and fuel nozzles in fluid communication with the fuel passage extend through to the outside of the outer wall. The AFS immersed injector can be additively manufactured. The AFS immersed injector provides robust internal cooling, such as near wall cooling and impingement cooling, while allowing re-use of the cooling air for combustion in the combustion liner.

Figure 2:
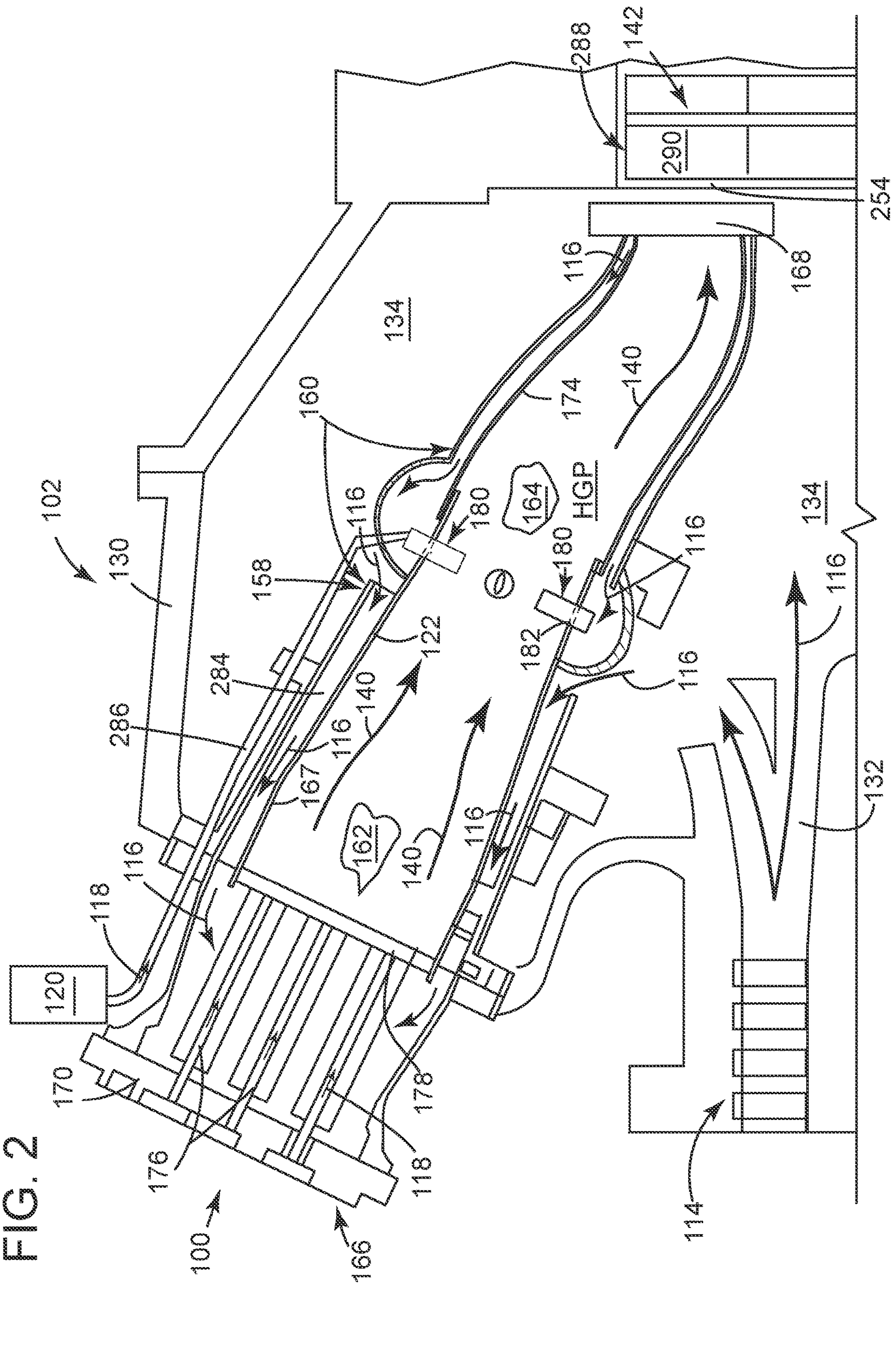
FIG. 2 shows a cross-sectional side view of a portion of a combustor with a AFS immersed injector according to embodiments of the disclosure.

FIG. 1 shows a functional block diagram of an illustrative GT system 102 that may incorporate various embodiments of a combustor 100 of the present disclosure; and FIG. 2 shows a cross-sectional view of combustor 100 according to embodiments of the disclosure. As shown in FIG. 1, GT system 102 generally includes an inlet section 110 that may include a series of filters, cooling coils, moisture separators, and/or other devices to purify and otherwise condition a working fluid (e.g., air) 112 entering GT system 102. Working fluid 112 flows to a compressor section where a compressor 114 progressively imparts kinetic energy to working fluid 112 to produce a compressed air 116 (hereafter "compressed air 116" or "air 116") at a highly energized state. Compressed air 116 is, among other things, mixed with a fuel 118 from a fuel supply 120 to form a combustible mixture within one or more combustors 100.

As shown in FIG. 2, combustor 100 is at least partially surrounded by an outer casing 130 such as a compressor discharge casing and/or a turbine casing. An interior of outer casing 130 is in fluid communication with a compressor discharge 132 of compressor 114 and creates a compressed air supply 134. That is, compressed air supply 134 includes compressed air 116 from compressor discharge 132 of compressor 114. However, compressed air supply 134 may be any supply of pressurized air 116 capable of flowing into any variety of opening or flow passage in combustor 100 to cool parts and/or for combustion.

Referring to FIG. 1, combustion gases 140 flow through a turbine 142 (e.g., an expansion turbine) of a turbine section to produce work. For example, turbine 142 may be connected to a shaft 146 so that rotation of turbine 142 drives compressor 114 of the compressor section to produce compressed air 116. Alternately, or in addition, shaft 146 may connect turbine 142 to a generator 148 for producing electricity. Exhaust gases 150 from turbine 142 flow through an exhaust section 152 that connects turbine 142 to an exhaust stack 154 downstream from turbine 142. Exhaust section 152 may include, for example, a heat recovery steam generator (not shown) for cleaning and extracting additional heat from exhaust gases 150 prior to release to the environment.

In one embodiment, GT system 102 may include a commercially available gas turbine engine from GE Vernova of Cambridge, MA. The present disclosure is not limited to any one particular GT system and may be implanted in connection with other engines including, for example, the HA, F, B, LM, GT, TM and E-class engine models of GE Vernova, and engine models of other companies. Furthermore, the present disclosure is not limited to any particular turbomachine and may be applicable to, for example, steam turbines, jet engines, compressors, turbofans, etc.

As shown in FIG. 2, combustors 100 include a combustor body 158 including combustion liner 160 that contains and conveys combustion gases 140 to a turbine section including turbine 142. As will be described herein, combustion liner 160 may extend between a head end fuel nozzle assembly 166 and an aft frame 168. Combustion liner 160 includes a primary combustion zone 162 and a secondary combustion zone 164. More particularly, combustion liner 160 defines a combustion chamber within which combustion occurs in primary combustion zone 162 and secondary combustion zone 164. A combustible mixture of fuel and air is burned to produce combustion gases 140 having a high temperature and pressure. Combustion liner 160 may have a cylindrical portion 172 and a tapered transition portion 174 integral with cylindrical portion 172, i.e., forming a unified body (or "unibody") construction. In accordance with embodiments of the disclosure, combustion liner 160 and/or combustor body 158 may be additively manufactured.

Combustor 100 may include head end fuel nozzle assembly 166 (hereafter "head end assembly 166") coupled to a forward end 167 of combustion liner 160 for supplying a fuel and air combustible mixture to primary combustion zone 162. Head end fuel nozzle assembly 166 may include any now known or later developed fuel nozzle assembly for delivering fuel 118 to primary combustion zone 162 from axially extending fuel nozzles 176. Head end assembly 166 generally includes at least one axially extending fuel nozzle 176 that extends downstream from end cover 170 and a cap assembly 178 that extends radially and axially within combustion liner 160 downstream from end cover 170 and that defines the upstream boundary of the combustion chamber.

Figure 3:
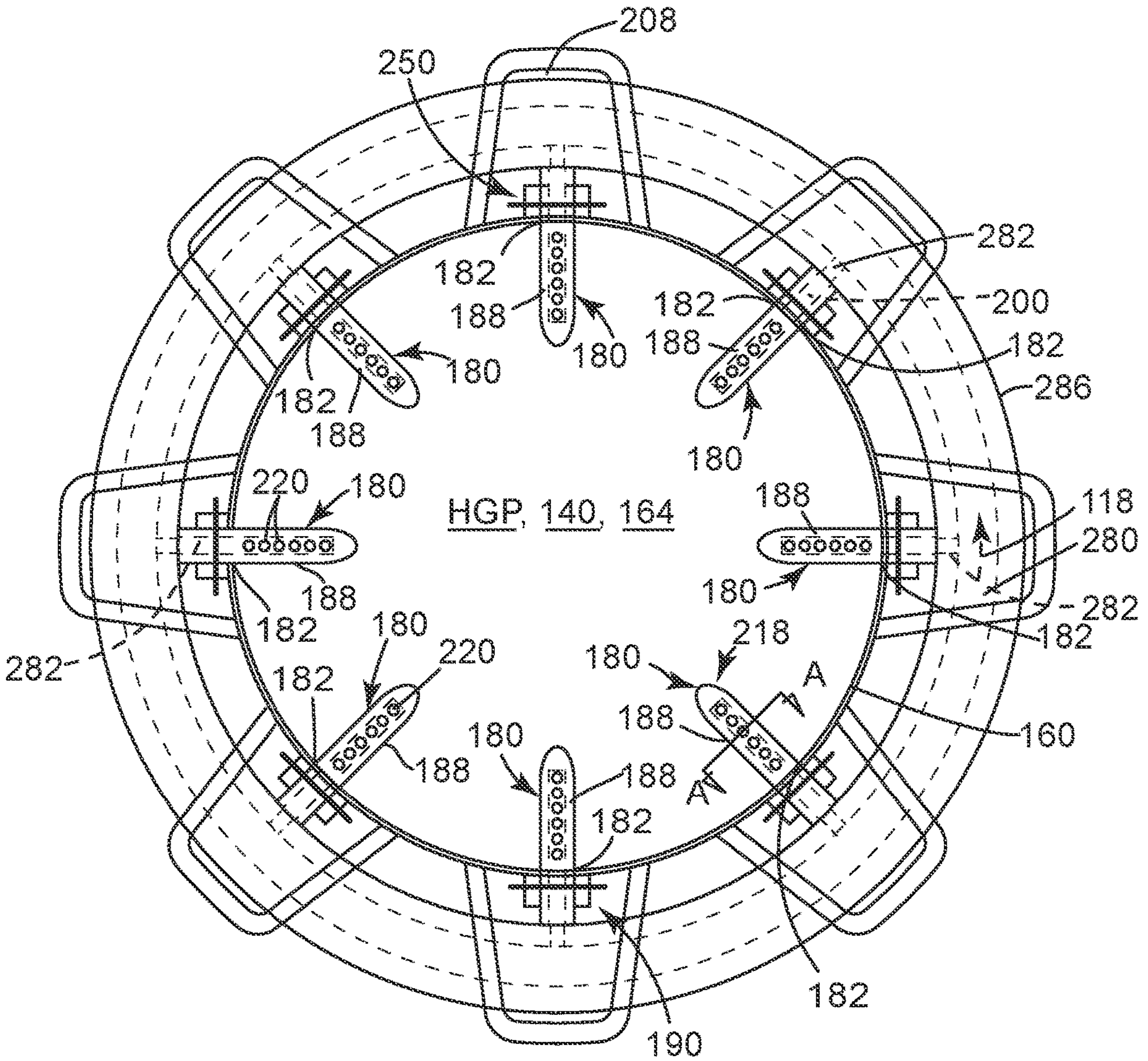
FIG. 3 shows an end view of a plurality of AFS immersed injectors in a combustion liner according to embodiments of the disclosure.

Combustor 100 also includes a plurality of axial fuel stage (AFS) immersed injectors 180 extending radially into combustion liner 160, e.g., in secondary combustion zone 164. FIG. 3 shows an end view of AFS immersed injectors 180 in combustion liner 160. With reference to FIGS. 2 and 3, each AFS immersed injector 180 extends through an opening 182 in combustion liner 160. The injectors are referred to as "immersed" because they extend into secondary combustion zone 164 and combustion gases 140 therein. Hence, they are immersed in secondary combustion zone 164 and combustion gases 140 therein. As will be described further, each AFS immersed injector 180 may be additively manufactured, e.g., with combustor body 158 or as a separate part coupled to combustor body 158.

Figure 4:
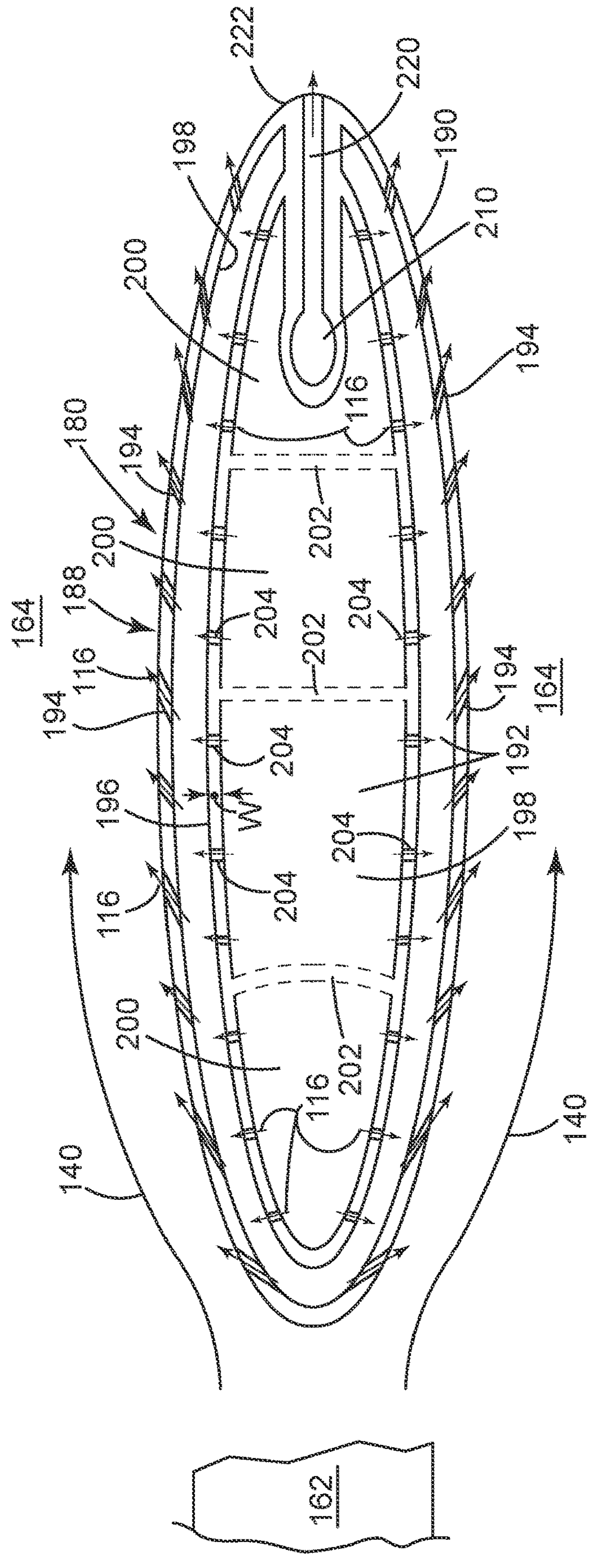
FIG. 4 shows a cross-sectional view of an AFS immersed injector along view line A-A in FIG. 3 according to embodiments of the disclosure.
Figure 5:
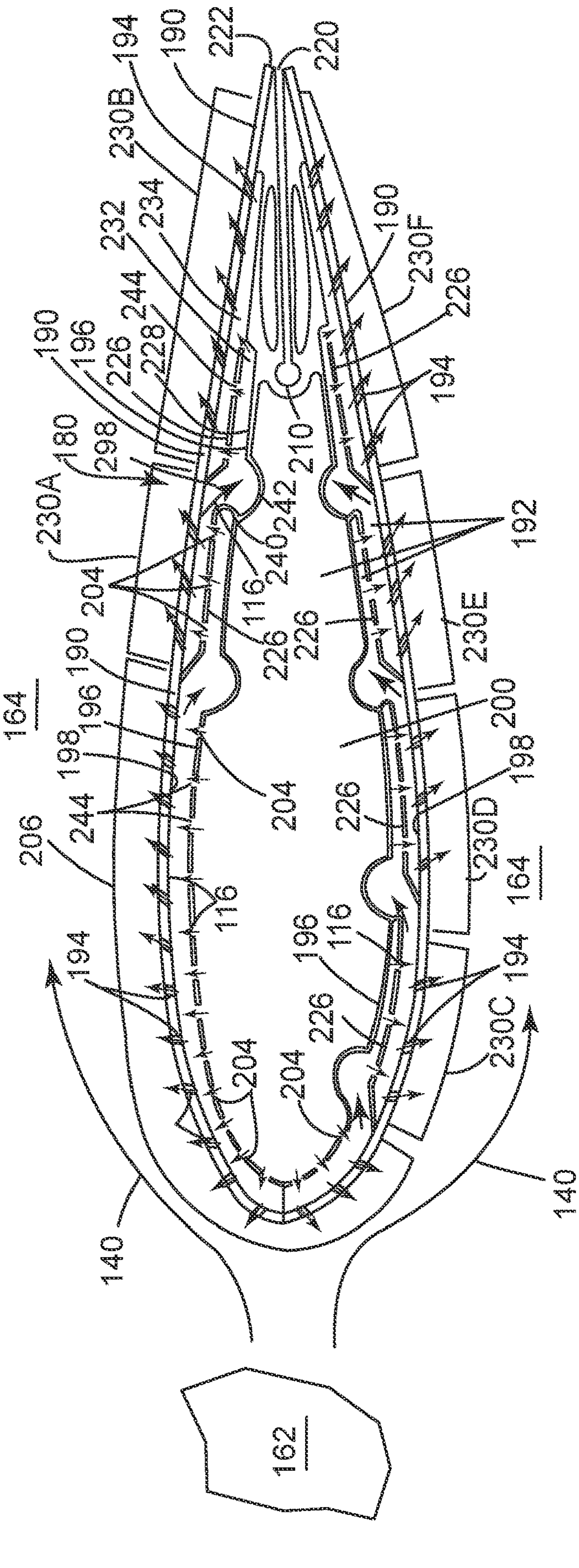
FIG. 5 shows a cross-sectional view of an AFS immersed injector along view line A-A in FIG. 3 according to other embodiments of the disclosure.
Figure 6:
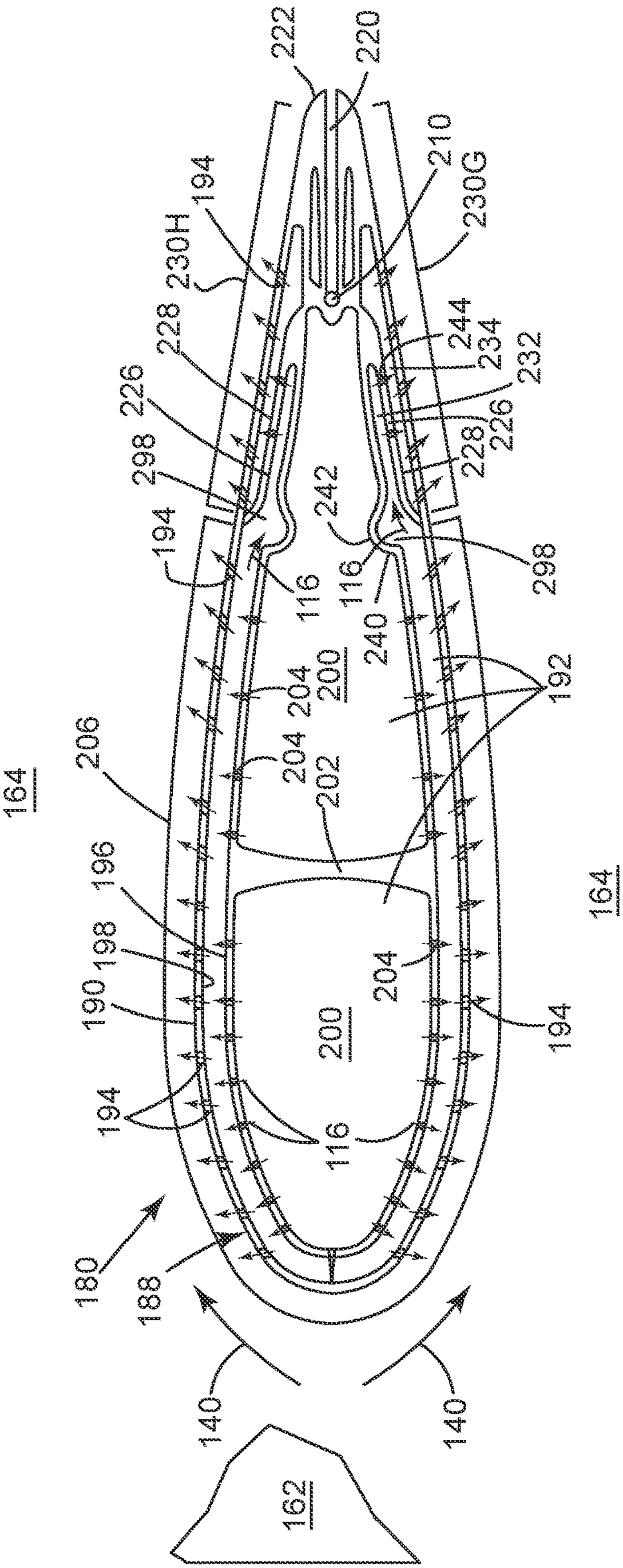
FIG. 6 shows a cross-sectional view of an AFS immersed injector along view line A-A in FIG. 3 according to yet other embodiments of the disclosure.

Each AFS immersed injector 180 may include an injector body 188. FIGS. 4-6 show cross-sectional views along view line A-A in FIG. 3 according to various embodiments of the disclosure. As shown in FIGS. 4-6, injector body 188 may include an outer wall 190 defining a hollow interior 192 and having a plurality of film cooling holes 194 extending from hollow interior 192 to an outside of outer wall 190. The outside of outer wall 190 includes secondary combustion zone 164 within combustion liner 160 (FIGS. 2-3). As will be further described, air 116 from within injector body 188 passes through film cooling holes 194 to provide film cooling on outside of outer wall 190 and, subsequently, to aid in combustion within secondary combustion zone 164. In one non-limiting example, outer wall 190 may have a thickness in a range of 1.78-2.79 millimeters (mm) (0.07-0.11 inches). Film cooling holes 194 may have any necessary size, number, location, and arrangement to provide the desired film cooling flow characteristics and/or combustion characteristics for a particular combustor 100. Film cooling holes 194 may be at a non-perpendicular angle with respect to outside (outer surface) of outer wall 190, e.g., to direct air 116 in a flow direction of combustion gases 140 (arrows in FIGS. 4-6) in combustion liner 160 (FIGS. 2-3). Note, however, film cooling holes 194 can have different angles with outside of outer wall 190 depending on their location in outer wall 190.

Injector body 188 may also include an inner wall 196 spaced from an inside 198 of outer wall 190 along at least part of a length of outer wall 190, i.e., into and out of page of FIGS. 4-6. Inner wall 196 defines an air plenum 200 therein. Air plenum 200 may include one or more air plenums, which may include any form of air passages or cavities defined within inner wall 196, e.g., by any number of longitudinally extending walls 202 (shown with dashed lines in FIG. 4 and solid line in FIG. 6). FIGS. 4 and 6 show embodiments including a plurality of air plenums 200. In FIG. 4, for example, up to four air plenums 200 (via three walls 202) are provided. FIG. 6 shows two air plenums 200 separated by one wall 202. In contrast, in FIG. 5, one large air plenum 200 is used. It is emphasized that any number and size of air plenums 200 can be used.

As will be further described, each air plenum 200 is in fluid communication with compressed air supply 134. In certain embodiments, as will be further described, air plenum(s) 200 may be open at an end (i.e., a radially outer end) of injector body 188 that extends through combustion liner 160 and is in fluid communication with compressed air supply 134. In an alternative embodiment, shown in FIGS. 3 and 9, AFS injector 180 may also include at least one air plenum 200 in fluid communication with a compressed air delivery plenum 208 extending along an outside of combustion liner 160. Compressed air delivery plenum 208 is in fluid communication with air supply 134, e.g., via openings therein or any necessary routing conduit.

Figure 7:
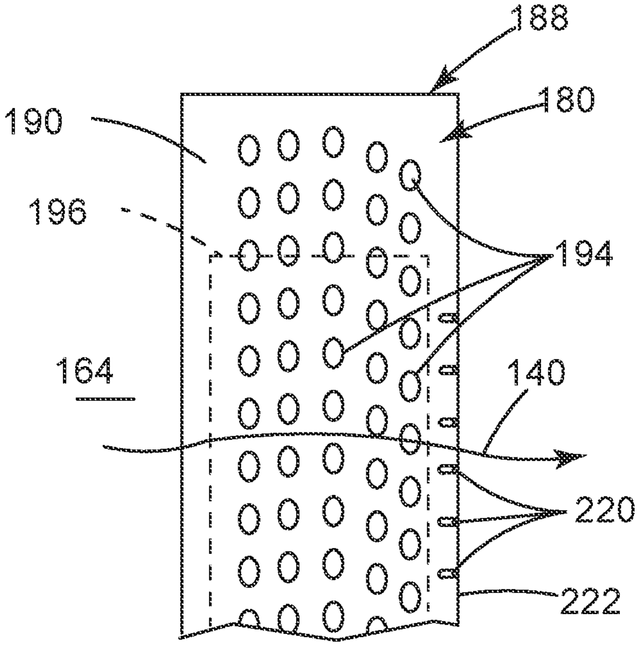
FIG. 7 shows a schematic view of a radially inner end of an AFS injector according to an alternative embodiment of the disclosure.

Inner wall 196 may extend an entire length of injector body 188 and outer wall 190 (into and out of page of FIGS. 4-6). Alternatively, as shown in the schematic side view of a radial outer end of an injector body 188 in FIG. 7, inner wall 196 may extend only partially along a length of outer wall 190. In one non-limiting example, inner wall 196 may have an internal width W in a range of 12.70-19.05 millimeters (mm) (0.5-0.75 inches).

Inner wall 196 also includes a plurality of impingement cooling holes 204 extending through inner wall 196 along at least a first portion of inner wall 196 to direct cooling air along a corresponding first portion of outer wall 190. Impingement cooling holes 204 are in fluid communication with air plenum 200 and thus direct compressed air 116 against inside 198 of outer wall 190 to cool outer wall 190. The number, size, location, and arrangement of impingement cooling holes 204 can be user-defined based on, for example, the fuel being used, air 116 characteristics, size of injector body 188 and/or combustor 100, operating temperatures, and injector body 188 material, among other things.

Injector body 188 also includes a fuel passage 210 extending at least partially along hollow interior 192 of outer wall 190. Fuel passage(s) 210 in injector body 188 is/are in fluid communication with fuel supply 120, e.g., through fuel conduit 286 (FIG. 2-3) extending along an outside of combustion liner 160 and/or fuel conduit 286 (FIGS. 2-3) incorporated into combustion liner 160. Any form of fuel 118 can be directed in fuel passages 210 in injector body 188. Fuel passage 210 is shown in FIGS. 4-5 as extending within hollow interior 192 and within inner wall 196. However, in other embodiments, as shown in FIG. 6, fuel passage 210 can be incorporated into inner wall 196, i.e., formed within inner wall 196.

Injector body 188 also includes a plurality of fuel nozzles 220 extending through at least one of inner wall 196 and outer wall 190 to the outside of outer wall 190, i.e., to secondary combustion zone 164. Each fuel nozzle 220 is in fluid communication with fuel passage(s) 210. Fuel nozzles 220 can be spaced longitudinally along injector body in any manner, e.g., uniformly, in groups, non-uniformly, etc. Fuel nozzles 220 can be spaced longitudinally along a trailing edge 222 of injector body 188 where it has an airfoil cross-sectional shape. Fuel nozzles 220 can have any configuration to provide the desired fuel and air mixing and/or distribution.

With further regard to the first portion of inner wall 196 and outer wall 190 that includes impingement cooling holes 204, in FIG. 4, the first portions of inner wall 196 and outer wall 190 (not labeled) actually include an entirety of each wall, excepting where fuel nozzles 220 extend therethrough. In contrast, in other embodiments as shown in FIGS. 5 and 6, first portions 206 of inner wall 196 and outer wall 190 include only a part of each wall 196, 190. In the FIG. 5 example, first portion 206 extends from roughly the 8 o'clock position to roughly the 1 o'clock position of inner and outer wall 196, 190, and in the FIG. 6 example, first portion 206 extends from roughly the 6 o'clock position to roughly the 12 o'clock position of inner and outer wall 196, 190. In the FIG. 5 example, first portion 206 encompasses the leading edge of injector body 188 where it has an airfoil cross-sectional shape and includes a relatively small area on one side of injector body 188 and a relatively longer area on an opposite side of injector body 188. In the FIG. 6 example, first portion 206 encompasses the leading edge of injector body 188 where it has an airfoil cross-sectional shape and includes a majority of the area on both sides of injector body 188. As illustrated in the FIG. 6 example, first portion 206 includes roughly the same area on each side of injector body 188.

As shown in FIGS. 5 and 6, outside of first portion 206, injector body 188 also includes one or more intermediate walls 226 extending from inside 198 of outer wall 190 to an outer surface 228 of inner wall 196 along at least one second portion 230 of inner wall 196 and outer wall 190. In certain embodiments, intermediate wall 226 may include a plurality of intermediate walls 226 spaced along a respective plurality of second portions 230 of inner wall 196 and outer wall 190. In FIG. 5, six second portions 230A-F each with a respective intermediate wall 226 are shown, and in FIG. 6, two second portions 230G-H each with a respective intermediate wall 226 are shown.

Intermediate wall(s) 226 may extend in a curved manner from inside 198 of outer wall 190 to outer surface 228 of inner wall 196. As shown only with respect to second portion 230A or 230G for clarity in FIGS. 5 and 6, respectively, each intermediate wall 226 defines an air passage 232 between intermediate wall 226 and outer surface 228 of inner wall 196 and a near wall cooling passage 234 between intermediate wall 226 and inside 198 of outer wall 190. Intermediate wall(s) 226 may extend along walls 190, 196 any desired length. Where an end 240 of intermediate wall 226 meets an adjacent inner wall 196, inner wall 196 may include a curved portion 242 therein.

Intermediate wall(s) 226 include a second plurality of impingement cooling holes 244 defined in intermediate wall 226 and fluidly coupling air passage 232 and near wall cooling passage 234. Hence, each second portion 230 provides intermediate wall 226 to provide impingement cooling of inside 198 of outer wall 190 and near wall cooling of outer wall 190 using near wall cooling passage 234. As illustrated, each air passage 232 in a second portion 230 is in fluid communication with an outlet of an upstream one of first plurality of impingement cooling holes 204 (in inner wall 196 adjacent the respective air passage 232) or second plurality of impingement cooling holes 244 (in intermediate wall 226 adjacent to the respective air passage 232). Thus, air 116 (also shown by arrows in FIGS. 4-6) from air plenum 200 passes through first plurality of impingement cooling holes 204 in inner wall 196. Part of air 116 then passes through film cooling holes 194 in outer wall to secondary combustion zone 164, and part of air 116 passes to an air passage 232 of a downstream second portion 230 of inner wall 196 and outer wall 190 that includes intermediate wall 226. The part of air 116 in air passage 232 passes through second plurality of impingement cooling holes 244 in intermediate wall 226 to near wall cooling passage 234. The part of air 116 impinges on inside 198 of outer wall 190 and/or flows along outer wall 190 in near wall cooling passage 234. The air 116 then either completely exits through film cooling holes 194 in outer wall 190 to secondary combustion zone 164 or, if there is another (adjacent) downstream second portion 230, part of air 116 exits through film cooling holes 194 in outer wall 190 to secondary combustion zone 164 and another part of air 116 passes to adjacent downstream second portion 230 via a passage 298 (e.g., as shown in FIG. 5, from second portion 230A to adjacent second portion 230B).

Figure 8:
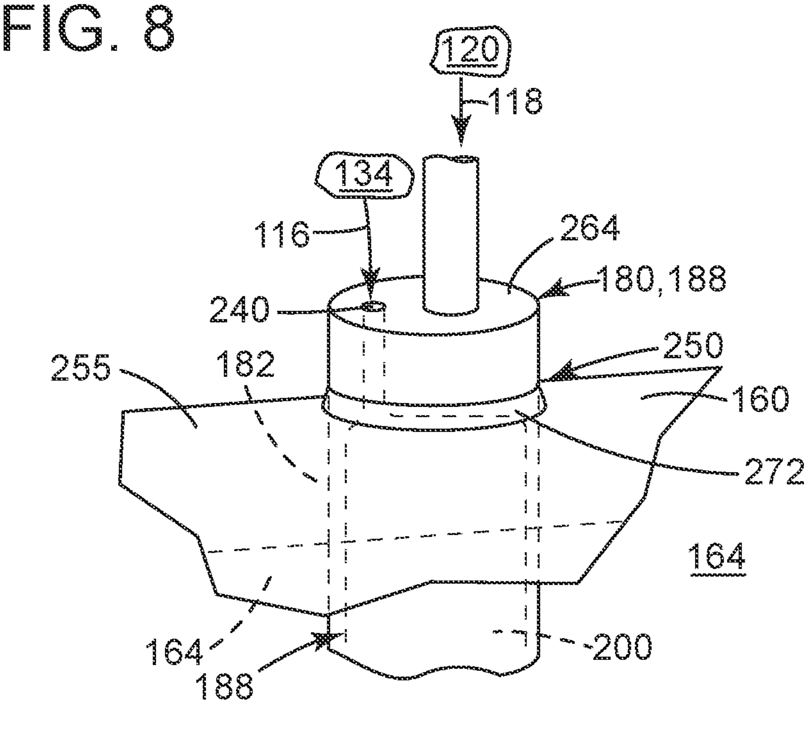
FIG. 8 shows a radially outer end perspective view of an AFS immersed injector according to embodiments of the disclosure.

FIG. 8 shows a perspective view of a radially outer end of injector body 188 of AFS immersed injector 180, according to embodiments of the disclosure. As noted, each air plenum 200 in injector body 188 is in fluid communication with compressed air supply 134, which is supplied with compressed air 116 from compressor discharge 132 of compressor 114. Compressed air 116 can also be delivered to AFS immersed injectors 180 in any now known or later developed manner. In certain embodiments, shown in FIG. 8, air plenum(s) 200 may be open at an end 240 thereof that extends through combustion liner 160 and is in fluid communication with compressed air supply 134. In an alternative embodiment, shown in FIGS. 3 and 9, AFS injector 180 may also include air plenum(s) 200 in fluid communication with air delivery plenum defined by a shrouded element 208 extending along an outside of combustion liner 160. Shrouded element 208 that defines the compressed air delivery plenum fluidly couples compressed air supply 134 to air plenum(s) 200 within each AFS immersed injector 180.

Figure 10:
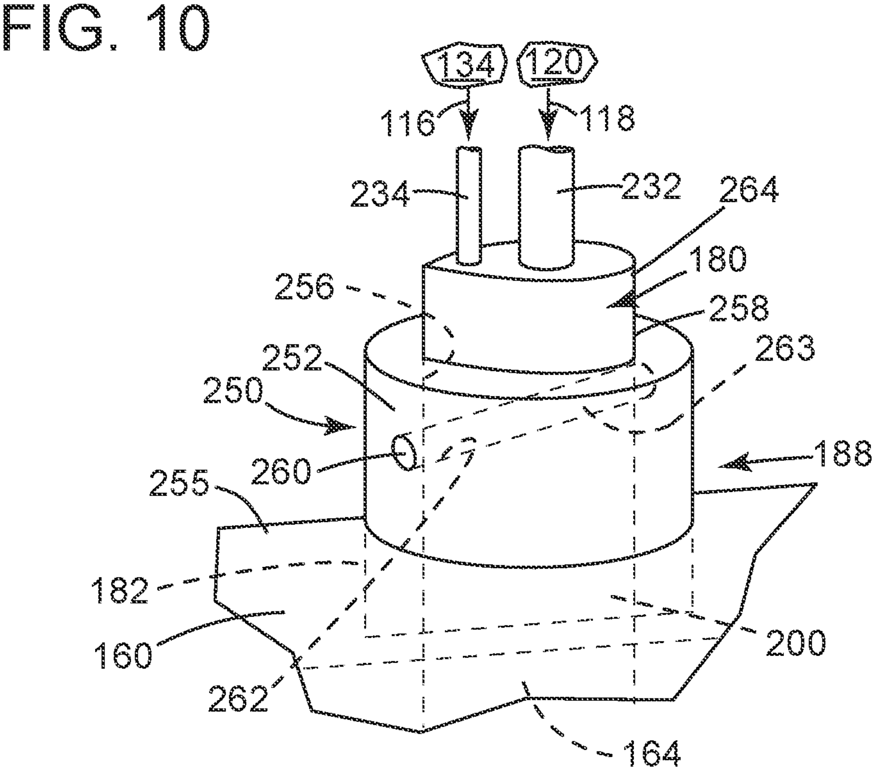
FIG. 10 shows a perspective view of a radially outer end of an AFS immersed injector according to other embodiments of the disclosure.

Each AFS immersed injector 180 may also include a coupler 250 at a first end of injector body 188 configured to couple the injector body in an opening 182 in combustion liner 160. FIG. 10 shows a radially outer end perspective view of a coupler 250 according to one embodiment of the disclosure. In certain embodiments, coupler 250 includes a sleeve 252 radially extending from an outer portion 255 of combustion liner 160 at each opening 182 of combustion liner 160. Each sleeve 252 may have an inner surface 256 configured to mate with an outer surface 258 of a respective AFS immersed injector 180, i.e., have the same cross-sectional shape. Sleeve 252 may be co-extensive with opening 182 in combustion liner 160. Coupler 250 may further include a pin 260 extending through an opening 262 in sleeve 252 and an opening 263 in a radially outer end 264 of AFS immersed injector 180. In this manner, pin 260 fixedly secures AFS immersed injector 180 in opening 182. That is, AFS immersed injector 180 cannot move relative to opening 182. Pin 260 can be any form of mechanical fixation mechanism, e.g., a threaded fastener, interference fit pin, etc., capable of securing AFS immersed injector 180 in place in sleeve 252 and opening 182 in combustion liner 160.

Figure 9:
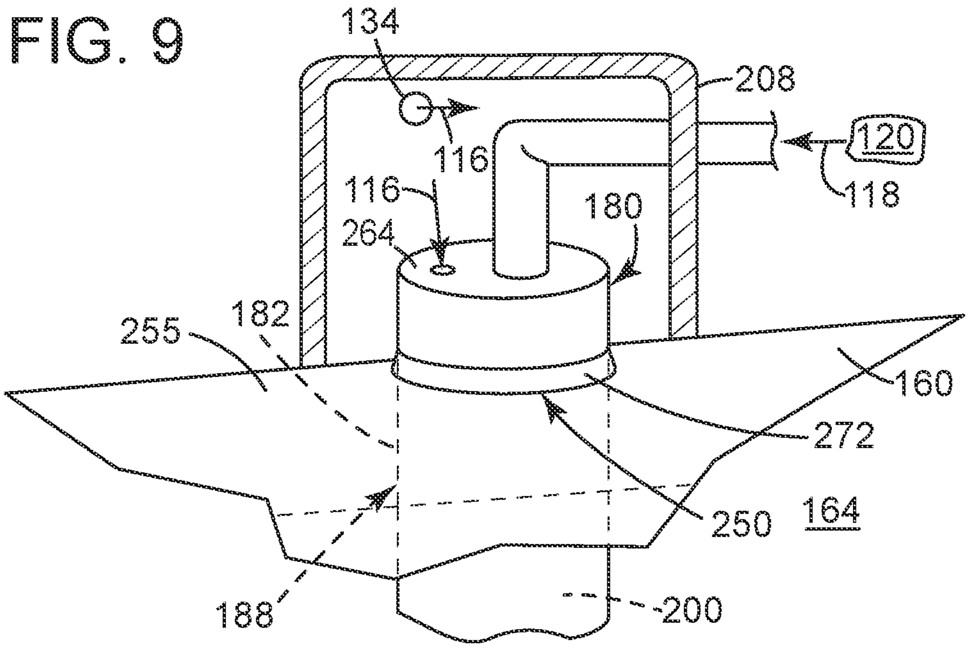
FIG. 9 shows a perspective view of a radially outer end of an AFS immersed injector according to other embodiments of the disclosure.
Figure 11:
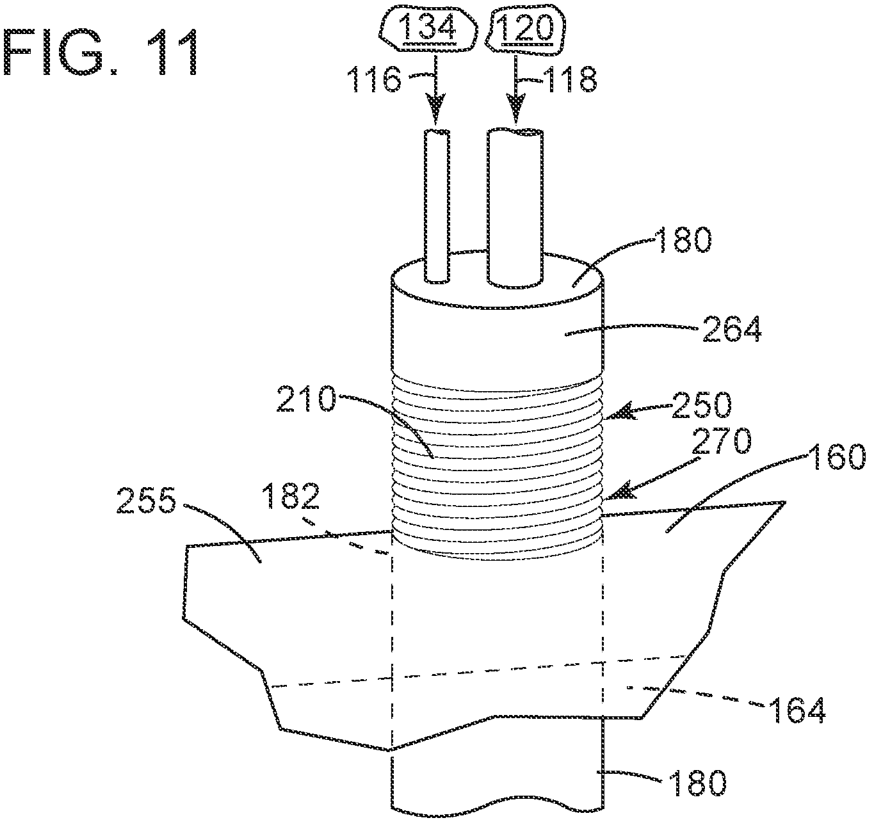
FIG. 11 shows a perspective view of a radially outer end of an AFS immersed injector according to yet other embodiments of the disclosure.
Figure 12:
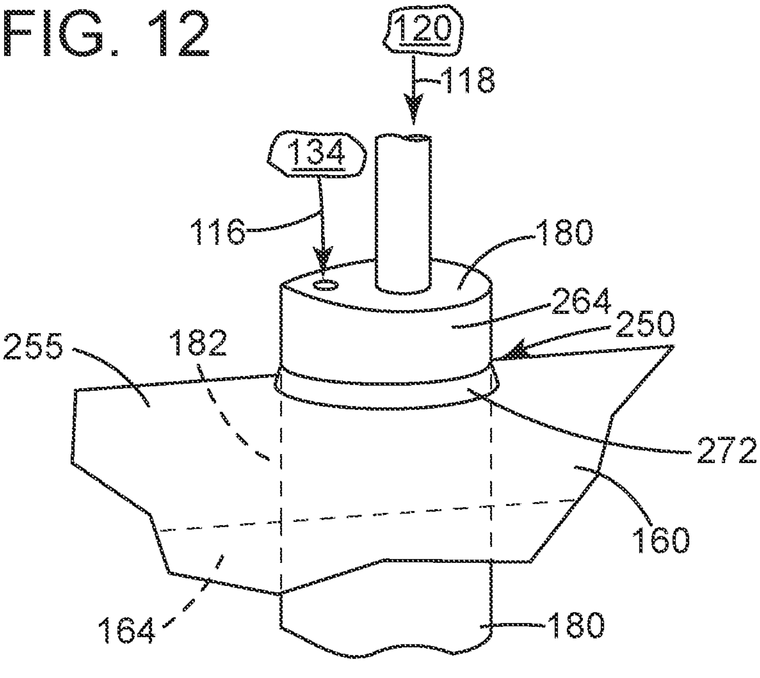
FIG. 12 shows a perspective view of a radially outer end of an AFS immersed injector according to additional embodiments of the disclosure.

Coupler 250 can take other forms also. FIG. 11 shows a perspective view of a radially outer end of AFS immersed injector 180 having a coupler 250 according to another embodiment. In FIG. 11, coupler 250 includes a threaded connection 270 between each AFS immersed injector 180 and respective opening 182 in combustion liner 160, i.e., with mating threaded fasteners. In this case, AFS immersed injector 180 may have a circular cross-section (e.g., at least at the radially outer end 264 thereof), and radially outer end 264 (surface) may be provided with threads thereon that are configured to mate with threads on an inner surface of opening 182. A threaded arrangement could also be used with sleeve 252 in the FIG. 10 embodiment rather than pin 260, i.e., where at least radially outer end 264 of injector body 188 has a circular cross-section. Coupler 250 with a threaded connection may have any necessary thread tolerance to prevent leakage from the hot gas path (HGP) within combustion liner 160. FIGS. 8, 9 and 12 show a perspective view of a coupler 250 according to another embodiment. In these embodiments, coupler 250 includes a tack weld 272 between radially outer end 264 of each AFS immersed injector 180 and outer portion 255 of combustion liner 160, i.e., at or around opening 182.

Radially inner ends of AFS immersed injectors 180 can have any desired configuration, e.g., rounded, cone, etc. In FIGS. 4-6, AFS immersed injector 180 has a symmetrical airfoil cross-sectional shape. Other cross-sectional shapes, e.g., circular, are also possible.

Arrangements of impingement holes 204, 244, film cooling holes 194, intermediate walls 226, air plenums 200, air passages 232, near wall cooling passages 234, fuel passages 210 and nozzles 220, among other structures, can take a variety of alternative forms other than those illustrated depending on a number of factors such as but not limited to: fuel characteristics (e.g., flow rate, combustibility, reactivity, pressure, temperature, etc.), other combustor physical and operational characteristics (e.g., combustion zone volume), and/or air characteristics (e.g., flow rate, pressure, temperature, etc.). Accordingly, it is emphasized that the arrangements shown herein are merely illustrative. Further, while FIG. 3 shows a circular fuel plenum 280 with radially extending passages 282 for delivering fuel 118 to fuel passages 210 in each injector body 188 of AFS immersed injectors 180, other arrangements are possible. That is, fuel 118 can be delivered in any now known or later developed fashion to fuel passages 210 in injector bodies 188.

Referring again to FIG. 2, combustor body 158 may also include an air flow passage 284 provided in combustion liner 160 or, as an alternative, by a flow sleeve (not shown) spaced from and surrounding a portion of combustion liner 160. Air flow passage 284 at least partially surrounds at least cylindrical portion 172 of combustion liner 160. Air flow passage 284 routes compressed air 116 across an outer surface of combustion liner 160 (cylindrical portion 172 and/or tapered transition portion 174). In addition, air flow passage 284 may route at least a portion of compressed air 116 to the one or more radially extending AFS immersed injectors 180 to combine with fuel 118 for combustion in a secondary combustion zone 164 that is downstream from primary combustion zone 162. In addition, as shown in FIG. 2, fuel conduits 286 extending along or in combustion liner 160 (or a fuel sleeve not shown) may deliver fuel 118 to AFS immersed injectors 180 from fuel supply 120, i.e., to fuel passages 210 in injector bodies 188.

Combustors 100 generally terminate at a point that is adjacent to a first stage 288 of stationary nozzles 290 of turbine 142. First stage 288 of stationary nozzles 290 at least partially defines a turbine inlet 254 to turbine 142. As noted, combustion liner 160 at least partially defines the HGP for routing combustion gases 140 from primary combustion zone 162 and secondary combustion zone 164 to turbine inlet 254 of turbine 142 during operation of GT system 102.

In operation, compressed air 116 flows from compressor 114 into an outer casing 130 that surrounds combustors 100 and is routed through fluid flow passage(s) in each combustor 100. A portion of compressed air 116 is routed to head end assembly 166 of combustor 100 where it reverses direction and is directed through axially extending fuel nozzle(s) 176. Compressed air 116 is mixed with fuel 118 to form a first combustible mixture that is injected into primary combustion zone 162. The first combustible mixture is burned to produce combustion gases 140. A second portion of compressed air 116 may be routed through the radially extending AFS immersed injectors 180 where it is mixed with fuel 118 supplied by fuel conduits 286 and delivered through internal fuel passage(s) 210 to form a second combustible mixture. In any event, the second combustible mixture is injected into combustion liner 160 and into the HGP. The second combustible mixture at least partially mixes with combustion gases 140 and is burned in secondary combustion zone 164. As noted, combustion liner 160 defines the HGP for routing combustion gases 140 from primary combustion zone 162 and secondary combustion zone 164 to turbine inlet 254 of turbine 142 during operation of GT system 102.

With regard to flow of air 116 in AFS immersed injectors 180, as shown by the arrows of air 116 in FIGS. 4-6, the second portion of compressed air 116 enters air plenum(s) 200 (coming out of page of FIGS. 4-6) and passes through plurality of impingement cooling holes 204 defined through inner wall 196, i.e., in any first portion(s) 206 in injector body 188. More particularly, in first portion(s) 206 of inner wall 196 and outer wall 190, air 116 impinges on inside 198 of outer wall 190 to cool it, and then a first part of the flow exits to secondary combustion zone 164 within combustion liner 160 through film cooling holes 194. Where a downstream second portion 230 exists (as in FIGS. 5 and 6), a second part of the flow moves to the downstream second portion 230. The size of each part of the flow can be controlled by, among other things, the size and number of film cooling holes 194 and the size of a passage 298 between first and second portions 206 and 230, or between second portions 230. With respect to any second portions of inner wall 196 and outer wall 190, e.g., 230A-F in FIG. 5, the second part of the flow of air 116 enters into a respective air passage 232 between intermediate wall 226 and inner wall 196 in the respective second portion 230. Air 116 then passes through impingement cooling holes 244 in the respective intermediate wall 226 and cools inside 198 of outer wall 190 in the respective second portion 230. Subsequently, the second part of the flow of air 116 is split again to either exit through film cooling holes 194 to secondary combustion zone 164 within combustion liner 160 or flow to a subsequent second portion, e.g., 230B or 230D-F in FIG. 5. For each subsequent or downstream second portion 230 of inner and outer walls 190, 196, the process of impingement cooling of inside 198 of outer wall 190 or passing to a subsequent air passage 232 repeats until all of air 116 exits into secondary combustion zone 164 to provide a layer of film cooling around AFS immersed injector 180 and to contribute to the second combustible mixture.

Figure 13:
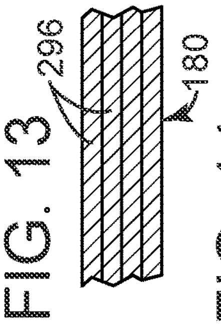
FIG. 13 shows a cross-sectional view of a plurality of parallel, sintered metal layers of a combustor body according to embodiments of the disclosure.
Figure 14:
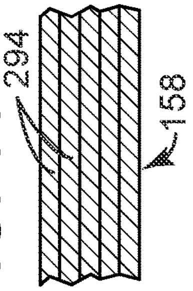
FIG. 14 shows a cross-sectional view of a plurality of parallel, sintered metal layers of an AFS immersed injector according to embodiments of the disclosure.

Combustor body 158 and each injector body 188 of AFS immersed injector 180 may be additively manufactured using any now known or later developed technique capable of forming the large, integral body. In certain embodiments, as shown in FIG. 13, combustor body 158 includes a plurality of parallel, sintered metal layers 294 of a first material, and, as shown in FIG. 14, each AFS immersed injector 180 includes a plurality of parallel, sintered metal layers 296 of a second material. The first material for combustor body 158 may include any now known or later developed combustion tolerant and oxidation resistant materials. The first material may include but is not limited to: an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), a nickel-chromium-cobalt-molybdenum alloy (NiCrCoMo) (e.g., Haynes 233 or Haynes 282 available from Haynes International, Inc.), or a nickel-chromium-cobalt-titanium (NiCrCoTi) alloy (e.g., GTD 262 developed by General Electric Company). AFS immersed injectors 180, i.e., injector bodies 188, may include a metal that is typically used in a hot gas path (HGP) component such as a turbine 142 blade or nozzle and that has a higher temperature and higher oxidation tolerance than first material used for combustor body 158. The metal may be a pure metal or an alloy.

The second material, which is used for combustor body 158, may include a non-reactive metal powder, i.e., from a non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247, Mar M 247, and any precipitation harden-able (PH) nickel alloy.

Figure 15:
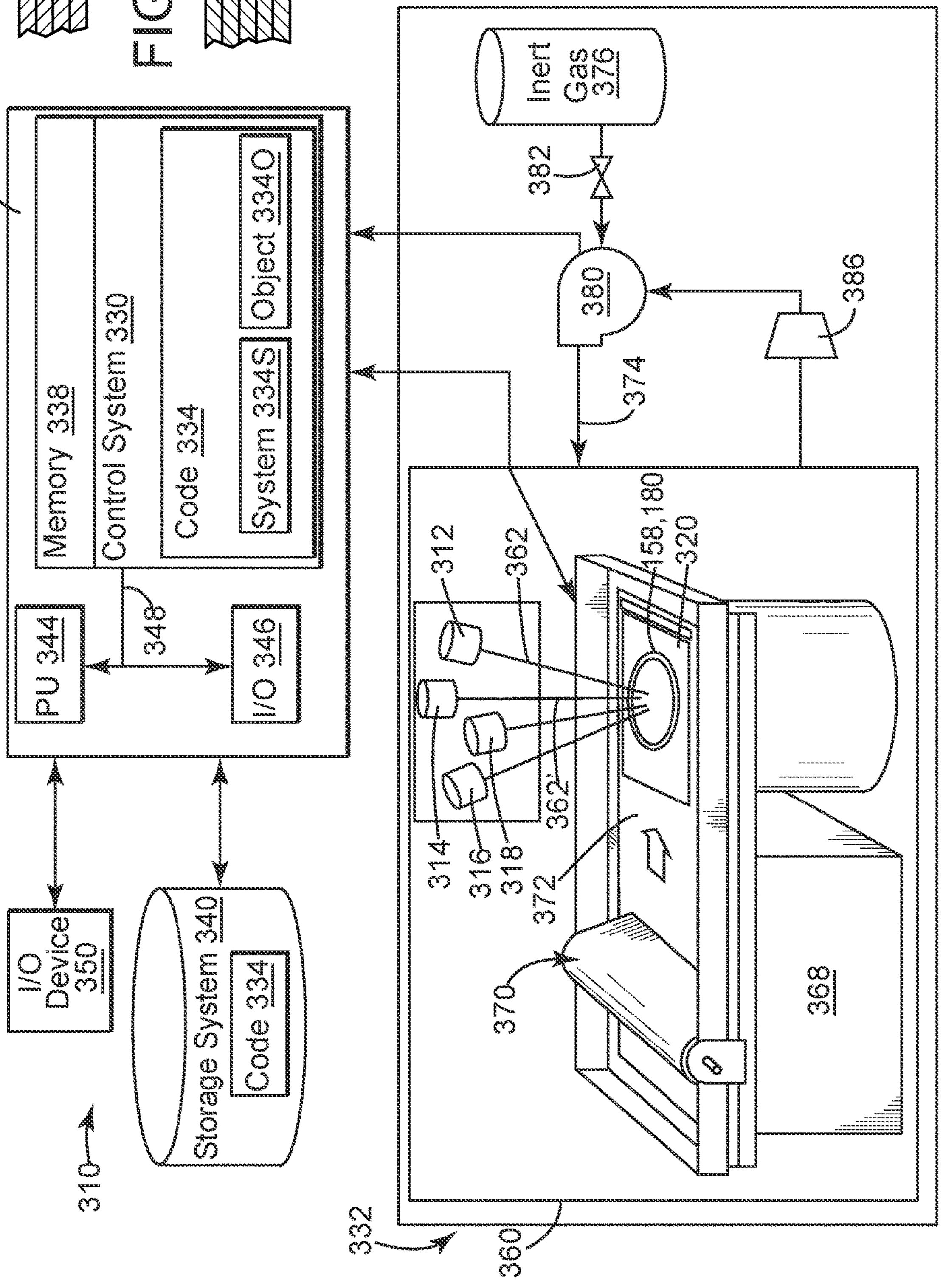
FIG. 15 shows a schematic block diagram of an illustrative additive manufacturing system for additively manufacturing a combustor body or AFS immersed injector according to the various embodiments of the disclosure.

FIG. 15 shows a schematic/block view of an illustrative computerized metal powder additive manufacturing system 310 (hereinafter 'AM system 310') for generating combustor body 158 and/or AFS immersed injectors 180, of which only a single layer is shown. Combustor body 158 and AFS immersed injectors 180 can be made separately or as an integral unitary piece. The teachings of the disclosures will be described relative to building combustor body 158 and/or AFS immersed injectors 180 using multiple melting beam sources 312, 314, 316, 318, but it is emphasized and will be readily recognized that the teachings of the disclosure are equally applicable to build combustor body 158 and/or AFS immersed injectors 180 using any number of melting beam sources.

In this example, AM system 310 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of combustor body 158 and/or AFS immersed injectors 180 in build platform 320 is illustrated in FIG. 15 as a circular element; however, it is understood that the additive manufacturing process can be readily adapted to manufacture any shaped part of combustor body 158 and/or AFS immersed injectors 180 on build platform 320.

AM system 310 generally includes an additive manufacturing control system 330 ("control system") and an AM printer 332. As will be described, control system 330 executes set of computer-executable instructions or code 334 to generate combustor body 158 and/or AFS immersed injectors 180 using multiple melting beam sources 312, 314, 316, 318. In the example shown, four melting beam sources may include four lasers. However, the teachings of the disclosures are applicable to any melting beam source, e.g., an electron beam, laser, etc. Control system 330 is shown implemented on computer 336 as computer program code. To this extent, computer 336 is shown including a memory 338 and/or storage system 340, a processor unit (PU) 344, an input/output (I/O) interface 346, and a bus 348. Further, computer 336 is shown in communication with an external I/O device/resource 350.

In general, processor unit (PU) 344 executes computer program code 334 that is stored in memory 338 and/or storage system 340. While executing computer program code 334, processor unit (PU) 344 can read and/or write data to/from memory 338, storage system 340, I/O device 350 and/or AM printer 332. Bus 348 provides a communication link between each of the components in computer 336, and I/O device 350 can comprise any device that enables a user to interact with computer 336 (e.g., keyboard, pointing device, display, etc.).

Computer 336 is only representative of various possible combinations of hardware and software. For example, processor unit (PU) 344 may comprise a single processing unit or be distributed across one or more processing units in one or more locations, e.g., on a client and server. Similarly, memory 338 and/or storage system 340 may reside at one or more physical locations. Memory 338 and/or storage system 340 can comprise any combination of various types of non-transitory computer readable storage medium including magnetic media, optical media, random access memory (RAM), read only memory (ROM), etc. Computer 336 can comprise any type of computing device such as an industrial controller, a network server, a desktop computer, a laptop, a handheld device, etc.

As noted, AM system 310 and, in particular control system 330, executes code 334 to generate combustor body 158 and/or AFS immersed injectors 180. Code 334 can include, among other things, a set of computer-executable instructions 334S (herein also referred to as 'code 334S') for operating AM printer 332 as a system, and a set of computer-executable instructions 334O (herein also referred to as 'code 334O') for defining respective objects, such as combustor body 158 and/or AFS immersed injectors 180, to be physically generated by AM printer 332. As described herein, additive manufacturing processes begin with a non-transitory computer readable storage medium (e.g., memory 338, storage system 340, etc.) storing code 334. Set of computer-executable instructions 334S for operating AM printer 332 may include any now known or later developed software code capable of operating AM printer 332.

The set of computer-executable instructions 334O defining combustor body 158 and/or AFS immersed injectors 180 may include a precisely defined 3D model of combustor body 158 and/or AFS immersed injectors 180 and can be generated from any of a large variety of well-known computer aided design (CAD) software systems such as AutoCAD®, TurboCAD®, DesignCAD 3D Max, etc. In this regard, code 334O can include any now known or later developed file format. Furthermore, code 334O representative of combustor body 158 and/or AFS immersed injectors 180 may be translated between different formats. For example, code 334O may include Standard Tessellation Language (STL) files, which were created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 334O representative of combustor body 158 and/or AFS immersed injectors 180 may also be converted into a set of data signals and transmitted, received as a set of data signals and converted to code, stored, etc., as necessary. Code 334O may be configured according to embodiments of the disclosure to allow for formation of border and internal sections in overlapping field regions, as will be described. In any event, code 334O may be an input to AM system 310 and may come from a part designer, an intellectual property (IP) provider, a design company, the operator or owner of AM system 310, or from other sources. In any event, control system 330 executes code 334S and 334O, dividing combustor body 158 and/or AFS immersed injectors 180 into a series of thin slices that assembles using AM printer 332 in successive layers of material.

AM printer 332 may include a processing chamber 360 that is sealed to provide a controlled atmosphere for combustor body 158 and/or AFS immersed injectors 180 printing. A build platform 320, upon which combustor body 158 and/or AFS immersed injectors 180 is/are built, is positioned within processing chamber 360. A number of melting beam sources 312, 314, 316, 318 are configured to melt layers of metal powder on build platform 320 to generate combustor body 158 and/or AFS immersed injectors 180. While four melting beam sources 312, 314, 316, 318 are illustrated, it is emphasized that the teachings of the disclosure are applicable to a system employing any number of sources, e.g., 1, 2, 3, or 5 or more. As understood in the field, each melting beam source 312, 314, 316, 318 may have a field including a non-overlapping field region, respectively, in which it can exclusively melt metal powder, and may include at least one overlapping field region in which two or more sources can melt metal powder. In this regard, each melting beam source 312, 314, 316, 318 may generate a melting beam, respectively, that fuses particles for each slice, as defined by code 334O.

For example, in FIG. 15, melting beam source 312 is shown creating a layer of combustor body 158 (or AFS immersed injector 180) using melting beam 362 in one region, while melting beam source 314 is shown creating a layer of combustor body 158 (or AFS immersed injector 180) using melting beam 362' in another region. Each melting beam source 312, 314, 316, 318 is calibrated in any now known or later developed manner. That is, each melting beam source 312, 314, 316, 318 has had its laser or electron beam's anticipated position relative to build platform 320 correlated with its actual position in order to provide an individual position correction (not shown) to ensure its individual accuracy. In one embodiment, each of plurality melting beam sources 312, 314, 316, 318 may create melting beams, e.g., 362, 362', having the same cross-sectional dimensions (e.g., shape and size in operation), power and scan speed.

Continuing with FIG. 15, an applicator (or re-coater blade) 370 may create a thin layer of raw material 372 spread out as the blank canvas from which each successive slice of the final combustor body 158 and/or AFS immersed injectors 180 will be created. Various parts of AM printer 332 may move to accommodate the addition of each new layer, e.g., a build platform 320 may lower and/or chamber 360 and/or applicator 370 may rise after each layer. The process may use different raw materials in the form of fine-grain metal powder, a stock of which may be held in a chamber or powder reservoir 368 accessible by applicator 370.

Processing chamber 360 is filled with an inert gas such as argon or nitrogen and controlled to minimize or eliminate oxygen. Control system 330 is configured to control a flow of a gas mixture 374 within processing chamber 360 from a source of inert gas 376. In this case, control system 330 may control a pump 380, and/or a flow valve system 382 for inert gas to control the content of gas mixture 374. Flow valve system 382 may include one or more computer controllable valves, flow sensors, temperature sensors, pressure sensors, etc., capable of precisely controlling flow of the particular gas. Pump 380 may be provided with or without valve system 382. Where pump 380 is omitted, inert gas may simply enter a conduit or manifold prior to introduction to processing chamber 360. Source of inert gas 376 may take the form of any conventional source for the material contained therein, e.g., a tank, reservoir or other source. Any sensors (not shown) required to measure gas mixture 374 may be provided. Gas mixture 374 may be filtered using a filter 386 in a conventional manner.

In operation, build platform 320 with metal powder thereon is provided within processing chamber 360, and control system 330 controls flow of gas mixture 374 within processing chamber 360 from source of inert gas 376. Control system 330 also controls AM printer 332, and in particular, applicator 370 and melting beam sources 312, 314, 316, 318 to sequentially melt layers of metal powder on build platform 320 to generate combustor body 158 and/or AFS immersed injectors 180 according to embodiments of the disclosure. While a particular AM system 310 has been described herein, it is emphasized that the teachings of the disclosure are not limited to any particular additive manufacturing system or method.

Once combustor body 158 and/or AFS immersed injectors 180 is/are formed, as shown in FIG. 2, it may be assembled with other parts of combustor 100 and/or to turbine inlet 254. For example, head end assembly 166 may be coupled to a forward end of combustor body 158. Head end assembly 166 may be coupled in any now known or later developed fashion, such as welding or fasteners. In addition, turbine inlet 254 may be coupled to aft frame 168. Aft frame 168 may be coupled to turbine inlet 254 in any now known or later developed fashion, such as welding or fasteners. AFS injectors 180 may be coupled to couplers 190, as illustrated in FIGS. 8-12 and as discussed above, such that the AFS injectors 180 extend radially inward into the combustion chamber.

The disclosure provides various technical and commercial advantages, examples of which are discussed herein. The additive manufactured combustor body lowers the costs of the combustor by eliminating the need to manufacture so many parts and then assemble the parts. As a result, the additive manufacturing results in as much as a 70% reduction in parts within a final combustor. The additive manufacturing also allows use of high temperature and high oxidation tolerant, hot gas path (HGP) materials for the AFS immersed injectors and lower cost materials for the combustor body. Moreover, the AFS immersed injector provides robust internal cooling, such as near wall cooling and impingement cooling, while allowing re-use of the cooling air for combustion in the combustion liner. Such robust internal cooling may be accomplished through cooling structures and flow paths that would be difficult to produce by conventional manufacturing methods, such as casting and machining.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of the technology and to enable others of ordinary skill in the art to understand the disclosure for contemplating various modifications to the present embodiments, which may be suited to the particular use contemplated.

What is claimed is:

1. An axial fuel stage (AFS) immersed injector, comprising:

an injector body configured to be positioned in a hot gas path within a combustion liner, the injector body including:

an outer wall defining a hollow interior and having a plurality of film cooling holes extending from the hollow interior to an outside of the outer wall;

an inner wall spaced from an inside of the outer wall along at least part of a length of the outer wall, the inner wall defining an air plenum therein;

a first plurality of impingement cooling holes extending through the inner wall along at least a first portion of the inner wall, the first plurality of impingement cooling holes in fluid communication with the air plenum;

a fuel passage extending at least partially along the hollow interior of the outer wall; and a plurality of fuel nozzles extending through at least one of the inner wall and the outer wall to the outside of the outer wall, each fuel nozzle in fluid communication with the fuel passage.

2. The AFS immersed injector of claim 1, further comprising a coupler at a first end of the injector body, the coupler configured to couple the injector body in an opening of the combustion liner.

3. The AFS immersed injector of claim 1, wherein the air plenum includes a plurality of air plenums.

4. The AFS immersed injector of claim 1, further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, and wherein the air passage is in fluid communication with an outlet of an upstream one of the first plurality of impingement cooling holes and the second plurality of impingement cooling holes.

5. The AFS immersed injector of claim 4, wherein the intermediate wall includes a plurality of intermediate walls spaced along a respective plurality of second portions of the inner wall and the outer wall.

6. The AFS immersed injector of claim 1, wherein the plenum is in fluid communication with a compressed air delivery plenum extending along an outside of the combustion liner.

7. A combustor for a gas turbine system, the combustor comprising:

a combustion liner;

a plurality of axial fuel stage (AFS) immersed injectors extending radially into the combustion liner, each AFS immersed injector including an injector body including:

an outer wall defining a hollow interior and having a plurality of film cooling holes extending from the hollow interior to an outside of the outer wall;

an inner wall spaced from an inside of the outer wall along at least part of a length of the outer wall, the inner wall defining an air plenum therein;

a first plurality of impingement cooling holes extending through the inner wall along at least a first portion of the inner wall, the first plurality of impingement cooling holes in fluid communication with the air plenum;

a fuel passage extending at least partially along the hollow interior of the outer wall; and a plurality of fuel nozzles extending through at least one of the inner wall and the outer wall to the outside of the outer wall, each fuel nozzle in fluid communication with the fuel passage.

8. The combustor of claim 7, further comprising a coupler at a first end of the injector body, the coupler configured to couple the injector body in an opening of the combustion liner.

9. The combustor of claim 7, wherein the air plenum includes a plurality of air plenums.

10. The combustor of claim 7, further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, wherein the air passage is in fluid communication with an outlet of an upstream one of the first plurality of impingement cooling holes and the second plurality of impingement cooling holes.

11. The combustor of claim 10, wherein the intermediate wall includes a plurality of intermediate walls spaced along a respective plurality of second portions of the inner wall and the outer wall.

12. The combustor of claim 7, wherein the air plenum is in fluid communication with a compressed air delivery plenum extending along an outside of the combustion liner.

13. The combustor of claim 7, further comprising a head end fuel nozzle assembly coupled to a forward end of the combustion liner for supplying a fuel and air combustible mixture to the combustion liner.

14. A gas turbine (GT) system, comprising:

a compressor section;

a combustion section operatively coupled to the compressor section; and a turbine section operatively coupled to the combustion section, wherein the combustion section includes at least one combustor including a combustion liner and a plurality of axial fuel stage (AFS) immersed injectors extending radially into the combustion liner, each AFS immersed injector including an injector body including:

an outer wall defining a hollow interior and having a plurality of film cooling holes extending from the hollow interior to an outside of the outer wall;

an inner wall spaced from an inside of the outer wall along at least part of a length of the outer wall, the inner wall defining an air plenum therein;

a first plurality of impingement cooling holes extending through the inner wall along at least a first portion of the inner wall, the first plurality of impingement cooling holes in fluid communication with the air plenum;

a fuel passage extending at least partially along the hollow interior of the outer wall; and a plurality of fuel nozzles extending through at least one of the inner wall and the outer wall to the outside of the outer wall, each fuel nozzle in fluid communication with the fuel passage.

15. The GT system of claim 14, further comprising a coupler at a first end of the injector body, the coupler configured to couple the injector body in an opening of the combustion liner.

16. The GT system of claim 14, wherein the air plenum includes a plurality of air plenums.

17. The GT system of claim 14, further comprising an intermediate wall extending from an inside of the outer wall to an outer surface of the inner wall along at least one second portion of the inner wall and the outer wall, wherein the intermediate wall defines an air passage between the intermediate wall and the outer surface of the inner wall and a near wall cooling passage between the intermediate wall and the inside of the outer wall, wherein the intermediate wall includes a second plurality of impingement cooling holes fluidly coupling the air passage and the near wall cooling passage defined by the intermediate wall, and wherein the air passage is in fluid communication with an outlet of an upstream one of the first plurality of impingement cooling holes and the second plurality of impingement cooling holes.

18. The GT system of claim 17, wherein the intermediate wall includes a plurality of intermediate walls spaced along a respective plurality of second portions of the inner wall and the outer wall.

19. The GT system of claim 14, wherein the air plenum is in fluid communication with a compressed air delivery plenum extending along an outside of the combustion liner.

20. The GT system of claim 14, further comprising a head end fuel nozzle assembly coupled to a forward end of the combustion liner for supplying a fuel and air combustible mixture to the combustion liner.

* * * * *